United States Patent [19]

Berdan

[11] Patent Number: 5,484,278
[45] Date of Patent: Jan. 16, 1996

[54] BLOW-OUT VENT VALVE

[75] Inventor: Karl Berdan, Midland, Canada

[73] Assignee: Pebra GmbH Paul Braun, Altbrach, Germany

[21] Appl. No.: 195,507

[22] Filed: Feb. 14, 1994

[51] Int. Cl.[6] .............. B29C 45/26; B29C 45/40
[52] U.S. Cl. .............. 425/533; 264/161; 264/328.12; 264/334; 264/572; 425/215; 425/444; 425/546; 425/554; 425/556; 425/806
[58] Field of Search .............. 425/546, 553, 425/554, 556, 444, 533, 215, 806; 264/572, 334, 328.12, 338.13, 161

[56] References Cited

U.S. PATENT DOCUMENTS 3,672,807  6/1972  Genz .............. 425/556
3,936,261  2/1976  Jones et al. .............. 425/556
4,647,275  3/1987  Lundquist .............. 425/554
5,078,949  1/1992  Strunk et al. .
5,090,886  2/1992  Jaroschek .............. 264/572
5,254,306  10/1993  Inada et al. .............. 264/572
5,284,429  2/1994  Schneider et al. .............. 264/572

FOREIGN PATENT DOCUMENTS 2260932  5/1993  United Kingdom .

Primary Examiner—Jay H. Woo
Assistant Examiner—Joseph Leyson
Attorney, Agent, or Firm—Keck, Mahin & Cate

[57] ABSTRACT

A vent valve for a gas assisted injection molding machine has a valve member to control flow from the mold cavity. A shear co-operates with an anvil in the passageway between the mold and valve member to sever material in the passageway as the molded article is ejected.

16 Claims, 2 Drawing Sheets

BLOW-OUT VENT VALVE

BACKGROUND OF THE INVENTION

1. Field of the Invention

The present invention relates to molding machines for use with gas-assisted injection molding processes.

2. Description of the Prior Art

Gas-assisted injection molding has been developed to permit an article to be molded with a hollow interior. In this process, a mold is provided with a cavity of the external shape of the article. Molding material is inserted into the cavity so that it fills the cavity and gas is then injected within the cavity to expel a portion of the molding material through an outlet. The material adjacent the walls of the mold remains and can then be pressurized to enhance the surface finish of the finished article. Thereafter, the mold is opened and the article ejected.

This arrangement has been commercially successful although some difficulties remain in the ejection and quality control monitoring of the molding process. With existing processes, the venting of material is controlled by a valve member that effectively seals the internal cavity provided in the molded article. In so doing, however, it is not possible through visual inspection to determine whether or not the material has been expelled from the interior of the molded article. Moreover, removal of the molded article and of the vented material is difficult.

It is therefore an object of the present invention to obviate or mitigate the above disadvantages.

SUMMARY OF THE INVENTION

In general terms, the present invention provides a molding machine in which material is expelled from the cavity through a passageway connected to an outlet. A valve member controls flow of the material through the passageway. A shear is provided in the passageway between the valve member and the cavity and operates to sever the material within the passageway after the material has been expelled.

In the preferred embodiment, the shear co-operates with the material in the passageway to assist in ejection of the article from the mold cavity. The shear severs the material in such a way that a cross-section of the material in the passageway can be observed from which it can be seen whether that material is voided. This indicates whether or not the gas has succeeded in expelling material from the mold and provides an early indication of the quality of the molded product.

BRIEF DESCRIPTION OF THE DRAWINGS

An embodiment of the invention will now be described by way of example only, with reference to the accompanying drawings, in which.

DESCRIPTION OF THE PREFERRED EMBODIMENT

Figure 1:
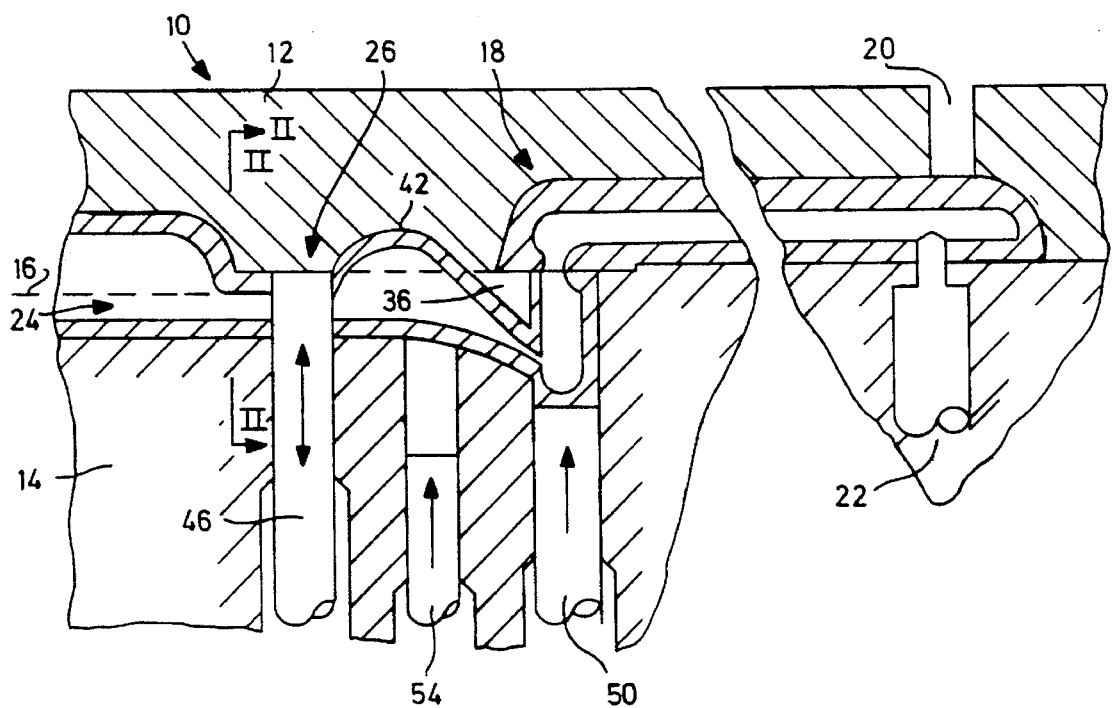
FIG. 1 is a side elevation of a portion of a molding machine.
Figure 2:
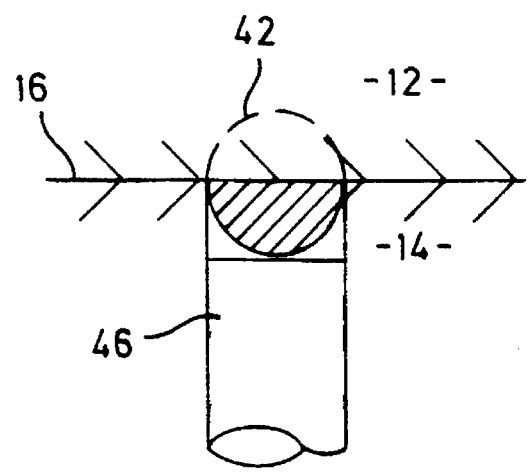
FIG. 2 is a view on the line 2—2 of FIG. 1.

Referring therefore to the drawings, a molding machine 10 has a cavity side 12 and a core side 14 that abut along a common plane indicated at 16. A cavity 18 is formed in the cavity side 12 and, together with the core side 14, defines the exterior surface of an article to be molded. Molding material is supplied through an inlet 20 and a gas injection nozzle 22 is positioned in the core side 14 to project into the cavity 18 and supply gas under pressure to the interior of the cavity 18.

Molding material is expelled from the cavity 18 through an outlet that is connected to the cavity 18 through a vent valve assembly 26. The vent valve assembly 26 controls the passage of material from the cavity 18 to the outlet 24.

As is well known in the art, the cavity side 12 and core side 14 are movable relative to one another between a closed position, as shown in FIG. 1 in which the cavity defines the outer surface of the article to be molded, and an open position in which the cavity side and core side are separated to allow the molded article to be removed. The mounting of the mold to permit this relative motion is well known in the art and need not be described further. Similarly, the provision of molding material to the inlet 20 and the provision of the gas to the nozzle 22 is also known in the art and will not be described further.

Figure 3:
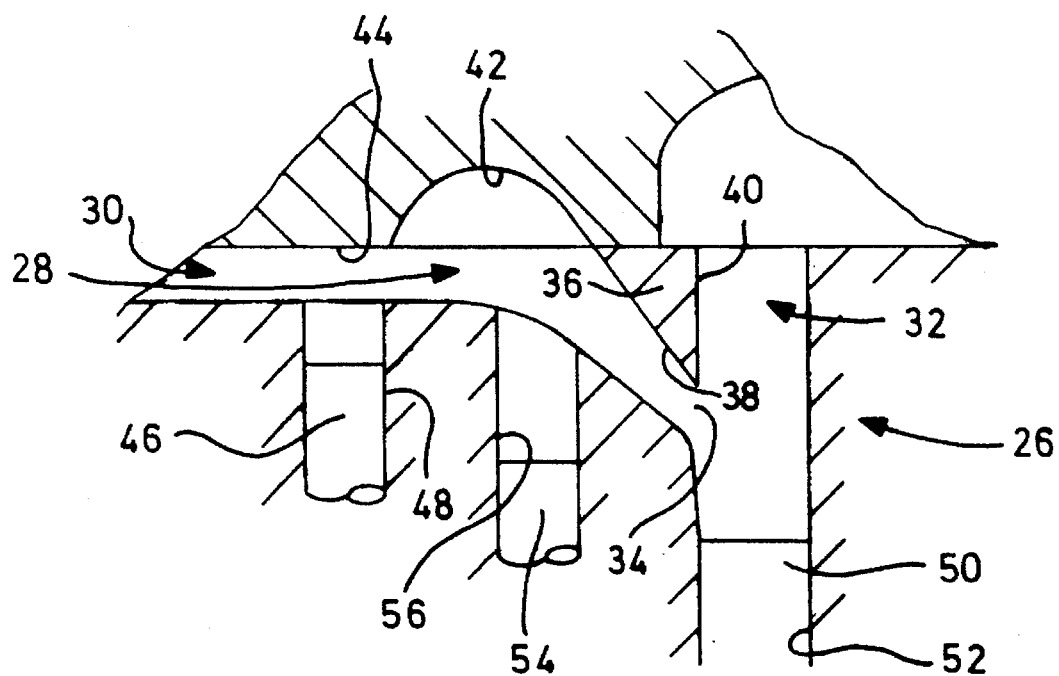
FIG. 3 is a view on an enlarged scale of a portion of the mold shown in FIG. 1.

The vent valve 26 includes a passageway 28 that connects the outlet 24 with the cavity 18. The form of the passageway 28 can best be seen in FIG. 3 and includes two opposed legs, namely a horizontal leg 30 and a vertical leg 32, that intersect at a throat 34. The legs 30,32 are separated by an anvil 36 that is defined by a pair of convergent surfaces 38,40 that intersect at an apex having an acute included angle. The vertical leg 32 extends from the cavity 18 and is of uniform circular cross-section. The horizontal leg 30 is of progressively increasing cross-section as it extends from the throat 34 and has a smoothly curved domed wall 42 extending from the surface 38 across the common plane 16. The domed wall 42 terminates at a planar abutment surface 44 that extends to the outlet 24.

The vent valve 26 includes a valve member 46 to regulate flow through the passageway 28, a shearing pin 50 to sever material in the passageway 28, and an ejector pin 54 to eject material from the passageway 28.

Valve member 46 is slidably mounted in a bore 48 provided in the core member 14 opposite the abutment surface 44. The valve member 46 is movable by air or hydraulic fluid and is effective to prevent flow through the passageway 28.

Shearing pin 50 is slidably mounted in a bore 52 provided as an extension of the vertical leg 32. The shearing pin 50 is slidable across the throat 34 and into the vertical leg 32 along the surface 40.

Ejector pin 54 is slidably mounted in a bore 56 opposite the domed wall 42 and is slidable along the bore 56 to engage and eject material in the passageway 28. It will be appreciated that the valve member 46, shearing pin 50 and ejector pin 54 may be operated by air, hydraulic fluid or a mechanical cam actuation under the control of a suitable timing circuit interlocked with the operation of the mold. The design and implementation of such a circuit is considered to be within the scope of one skilled in the art and will not be described further.

In operation, the cavity side 12 and core side 14 are moved to a closed position to define the cavity 18. Material is introduced in a molten state through the inlet 20 to fill the cavity 18. Once the cavity 18 is full, gas under pressure is introduced through the nozzle 22 and the material in the cavity is expelled through the passageway 28 to the outlet 24. An outer wall of molding material is left within the cavity following the application of the gas as indicated in FIG. 1 to define the outer wall of the molded article.

Once the material has been expelled, the valve member 46 slides up against the abutment surface 44 to pressurize the cavity 18. The pressurization of the cavity ensures that the walls are firmly pressed against the walls of the cavity to enhance the surface finish of the article.

After a predetermined time during which the molding material solidifies, the mold is opened by separation of the cavity side and the core side along the common plane 16. The molded article remains located on the core side by virtue of its connection with material in the passageway 28. Once the mold is open, the shearing pin is advanced along the bore 52 and moves across the throat 34. The shearing pin 50 engages material deposited in the vertical leg 32 and forces it against the anvil 36. The convergent surfaces 38,40 enhance the shearing action of the pin 50 to sever the material in the passageway.

As the shearing pin 50 advances, it operates in conjunction with additional ejection pins (not shown) to eject the molded article. At the same time, the ejector pin 54 is advanced along the bore 56 to engage the material in the passageway between the valve member and the throat. Because the dome wall 42 and the outlet 24 straddle the separation plane 16, the ejector pin 54 pushes the waste material from the mold. The mold may then be prepared and closed for a subsequent molding operation.

The shearing action of the pin 50 severs the material at the throat 34 so that a cross-section of the material may be viewed after ejection by the pin 54. The cross-section will indicate whether the waste material is voided at its interior giving a visual indication as to whether or not the gas has been effective to purge the material from the interior of the article. This preliminary check is a good indication as to the quality of the finished article.

The walls of horizontal leg 30 of the passageway 28 adjacent the throat 34 diverges at an included angle in the order of 20° to facilitate removal of the waste material. The included angle between the surfaces 38 and 40 is preferably in the order of 60°, with the axis of the vertical leg 32 being normal to the longitudinal axis of the cavity 18. To facilitate flow of material through the passageway 28, it is preferred that the shearing pin 50 is retracted beyond a projection of the horizontal leg past the throat 34 as indicated in chain dot line.

It will be seen, therefore, that a simple yet effective arrangement is provided to allow separation of the waste material from the molded article and yet maintain an indication of the efficacy of the molding process.

We claim:

1. A molding machine comprising a mold having a core portion and a cavity portion defining a cavity therebetween to mold an article to a predetermined shape, said portions being relatively movable between a closed position in which said article is molded and an open position in which said molded article can be ejected from said mold; an inlet to supply molding material to said cavity, a gas inlet communicating with said cavity to supply pressurized gas to the interior of the article to be molded; an outlet to receive material expelled from said cavity by application of pressurized gas thereto, and a vent valve assembly to control flow of material to said outlet from said cavity, said assembly including a passageway extending between said cavity and said outlet, a valve member operable to control flow through said passageway, and a shear located in said passageway between said valve member and said cavity and operable to sever material in said passageway from said article in said cavity as said article is ejected from said cavity.

2. A molding machine according to claim 1 wherein said passageway includes an anvil and said shear is mounted in said passageway to move past said anvil in a shearing action to sever said material.

3. A molding machine according to claim 2 wherein said anvil forms an apex in said passageway to enhance said shearing action.

4. A molding machine according to claim 3 wherein at least a portion of said passageway between said anvil and said valve member extends between said portions of said mold when said mold is in said closed position to facilitate removal of material in said passageway when said mold is in said open position.

5. A molding machine according to claim 4 wherein upon movement of said shear past said anvil, said shear engages said article and ejects said article from said cavity when said mold is in said open position.

6. A molding machine according to claim 5 wherein an ejector pin is located between said shear and said valve member and operates to eject material from said passageway when said mold is open.

7. A molding machine according to claim 6 wherein said passageway progressively increases in cross-section from said anvil to said valve member.

8. A molding machine according to claim 7 wherein said passageway is of substantially uniform cross-section between said anvil and said cavity.

9. A molding machine according to claim 8 wherein said shear is a pin movable along said passageway between said anvil and said cavity.

10. A molding machine according to claim 9 wherein said apex has an acute included angle and is directed away from said cavity.

11. A molding machine according to claim 1 wherein said portions abut along a common surface and said passageway and outlet straddle said common surface to facilitate removal of material therefrom when said mold is in said open position.

12. A molding machine according to claim 11 wherein said passageway includes an anvil directed into said passageway to one side of said surface and said shear is mounted in said passageway, said shear being mounted to move past said anvil in a shearing action to sever material in said passageway.

13. A molding machine according to claim 12 wherein said passageway progressively increases in cross-section from said anvil and to said valve member.

14. A molding machine according to claim 13 wherein said anvil has a pair of surfaces converging at an acute angle in a direction away from said cavity to enhance said shearing action.

15. A molding machine according to claim 14 wherein said shear is located on said one side of said common surface and moves along one of said converging surfaces to engage material in said passageway and eject said article when said mold is in said open position.

16. A molding machine according to claim 15 wherein said passageway is of uniform cross-section between said anvil and said cavity and said shear is a pin slidable along said passageway toward said cavity.

\* \* \* \* \*